(Model.)
V. VAN VLECK.
DENTAL PLATE.
No. 287,199. Patented Oct. 23, 1883.
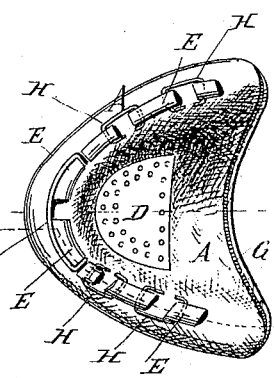
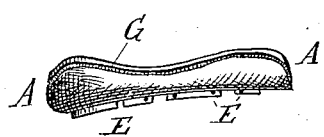
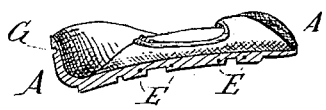
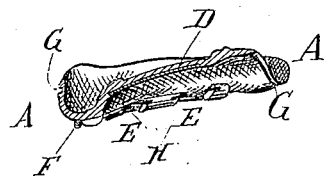
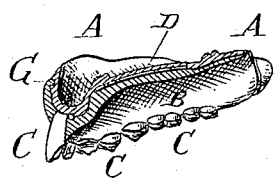
WITNESSES:
INVENTOR:
V. Van Vleck
BY
ATTORNEYS.

UNITED STATES PATENT OFFICE.

VOLKERT VAN VLECK, OF NEW YORK, N. Y.

DENTAL PLATE.

SPECIFICATION forming part of Letters Patent No. 287,199, dated October 23, 1883.

Application filed November 11, 1882. (Model.)

*To all whom it may concern:*

Be it known that I, VOLKERT VAN VLECK, of the city, county, and State of New York, have invented a new and useful Improvement in Dental Plates, of which the following is a full, clear, and exact description.

Reference is to be had to the accompanying drawings, forming part of this specification, in which similar letters of reference indicate corresponding parts in all the figures.

Figure 1 is a plan view of the lower side of my improved plate before the gum-rubber and the teeth are applied. Fig. 2 is a side elevation of the same. Fig. 3 is a sectional elevation of the same, taken through the line $y\ y$, Fig. 1. Fig. 4 is a sectional elevation of the same, taken through the line $x\ x$, Fig. 1. Fig. 5 is a sectional elevation of the completed plate.

The object of this invention is to promote strength and durability in dental plates, and also to secure a more accurate fit and a more natural expression of the face than is practicable when the plates are made in the ordinary manner.

The invention consists in a central plate made separate from the gum-rubber and the teeth, and provided with a metallic strengthening-plate and strengthening-wires. In the rubber plate, along the gum-ridge, are formed projections connected by wires, to make the connection between the said plate and the gum-rubber more secure. Along the edge of the rubber plate is formed a groove to serve as an outline for the gum-rubber and strengthen the connection between the gum-rubber and the said plate, as will be hereinafter fully described.

A represents the inner or main plate, which is made of rubber or allied substances, in the same manner as rubber plates are ordinarily made, but separate from the teeth. The plate A is then placed in the mouth, and forms a firm support for the teeth and wax to be used in preparing a mold for the teeth and gum-rubber, and allows the said wax to be applied in such a way as to obtain a perfect fit and retain the natural expression of the patient's face. The mold is then prepared, and the gum-rubber B is formed upon the plate A and the teeth C applied by the ordinary process.

In the middle part of the plate A is embedded a light metallic plate, D, which is perforated to give the rubber a firm hold upon it.

In the plate A, along the ridge that covers the gums, are formed dovetailed projections E to receive the gum-rubber B, and thus secure a firm connection between the said gum-rubber and the said plate A. The projections E are connected by wires H, which become embedded in the gum-rubber, and thus greatly strengthen the connection between the said gum-rubber and the plate A. For the same purpose the surface of the rubber plate A and the metal plate D are etched or roughened before the gum-rubber B is applied to them. By this construction the metal plate D greatly strengthens the rubber plate A against breaking or splitting when in use. The rubber plate A is further strengthened against breaking or splitting by a wire, F, placed upon or embedded in its surface along the middle part of the gum-ridge, and which has its ends bent, as shown in Fig. 1, to give it a firmer hold upon the said rubber plate. Along the edge of the rubber plate A is formed a groove, G, to serve as an outline for the edge of the gum-rubber B, and also to strengthen the connection between the said plates A B, by reason of the upper edge of the gum-rubber entering the groove G.

Having thus described my invention, what I claim as new, and desire to secure by Letters Patent, is—

1. In a dental plate, the combination, with the rubber plate A, of the metallic strengthening-wire F, embedded in the surface of the rubber plate, along the middle part of its gum-ridge, and having its ends bent down into the gum-ridge, substantially as described, and for the purpose set forth.

2. In a dental plate, the combination, with the rubber plate A, provided with projections E, formed upon the gum-ridge of said plate, and connecting-wires H, of the gum-rubber B, substantially as described, and for the purpose set forth.

VOLKERT VAN VLECK.

Witnesses:
   JAMES T. GRAHAM,
   C. SEDGWICK.